United States Patent
Bubulka et al.

(10) Patent No.: US 8,616,566 B2
(45) Date of Patent: Dec. 31, 2013

(54) HEAD PLATE FOR VEHICLE AXLE

(75) Inventors: John S. Bubulka, Westchester, IL (US); Sammy C. Lumetta, Naperville, IL (US); Ashley T. Dudding, Yorkville, IL (US); Jerry M. Lovett, Joliet, IL (US); Robert P. Sellberg, Munster, IN (US)

(73) Assignee: Hendrickson USA, L.L.C., Itasca, IL (US)

( * ) Notice: Subject to any disclaimer, the term of this patent is extended or adjusted under 35 U.S.C. 154(b) by 81 days.

(21) Appl. No.: 13/315,336

(22) Filed: Dec. 9, 2011

(65) Prior Publication Data

US 2012/0146396 A1    Jun. 14, 2012

Related U.S. Application Data

(60) Provisional application No. 61/422,948, filed on Dec. 14, 2010.

(51) Int. Cl.
    *B62D 7/18* (2006.01)
(52) U.S. Cl.
    USPC ............... 280/93.512; 180/905; 301/124.1; 301/132
(58) Field of Classification Search
    USPC ............... 301/127, 124.1, 132; 280/93.512; 180/905
    See application file for complete search history.

(56) References Cited

U.S. PATENT DOCUMENTS

| | | |
|---|---|---|
| 1,690,511 A | 11/1928 | Urschel |
| 1,784,856 A | 12/1930 | Urschel |
| 1,823,158 A | 9/1931 | Spatta et al. |
| 1,899,347 A | 2/1933 | Spatta et al. |
| 1,906,531 A * | 5/1933 | Buckwalter ............... 301/124.1 |
| 1,982,890 A * | 12/1934 | Urschel .................... 301/124.1 |
| 2,148,714 A | 2/1939 | Urschel |
| 3,072,441 A * | 1/1963 | Schilberg ................. 301/124.1 |
| 3,804,467 A | 4/1974 | Austermann |
| 5,588,660 A | 12/1996 | Paddison |
| 5,741,027 A | 4/1998 | Stroh |
| 5,810,377 A | 9/1998 | Keeler et al. |
| 5,865,452 A | 2/1999 | Chalin |
| 6,394,473 B1 | 5/2002 | Platner |
| 6,609,764 B2 | 8/2003 | Dudding et al. |

(Continued)

FOREIGN PATENT DOCUMENTS

| | | |
|---|---|---|
| DE | 19930672 A1 | 1/2000 |
| GB | 289684 A | 5/1928 |

OTHER PUBLICATIONS

ArvinMeritor RideStar RAL Front Air Suspension, 2003 Mid-America Trucking Show, circa 2003.

(Continued)

*Primary Examiner* — Ruth Ilan
(74) *Attorney, Agent, or Firm* — Cook Alex Ltd.

(57) ABSTRACT

A vehicle axle is provided with a main body defined by the combination of a channel having an inverted U-shaped configuration and a bottom plate. The ends of the main body are curved upwardly to define a pair of gooseneck portions. Axle head sections are formed at the ends of the axle and are closed off by end extensions extending from the front and rear walls of the channel and a cover flap extension extending from the top wall of the channel. A head plate having a rounded back edge and/or a pocket is inserted within the space between the cover flap and the top edges of the end extensions.

15 Claims, 15 Drawing Sheets

(56) References Cited

U.S. PATENT DOCUMENTS

| | | | |
|---|---|---|---|
| 6,799,811 B1 | 10/2004 | Dauber et al. | |
| 7,328,908 B2 * | 2/2008 | Barber et al. | 280/93.512 |
| 7,445,220 B2 | 11/2008 | von Mayenburg et al. | |
| 2007/0126198 A1 * | 6/2007 | Kirkham | 280/93.512 |
| 2008/0303236 A1 * | 12/2008 | Fuks et al. | 280/124.125 |
| 2009/0230760 A1 | 9/2009 | Bubulka et al. | |
| 2011/0101771 A1 * | 5/2011 | De Freitas Junior | 301/124.1 |

OTHER PUBLICATIONS

Hendrickson USA, L.L.C., Composolite FX—Fixed-axle suspension system, circa 2006.

International Search Report And Written Opinion for PCT Patent Application No. PCT/US2011/049078, dated Dec. 5, 2011.

International Search Report And Written Opinion For PCT Patent Application No. PCT/US2011/064071, dated Mar. 19, 2012.

* cited by examiner

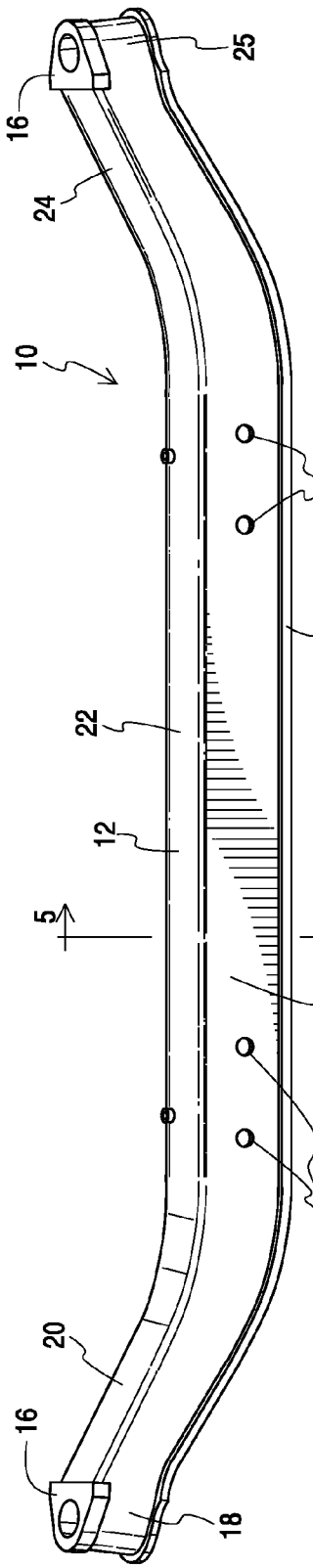
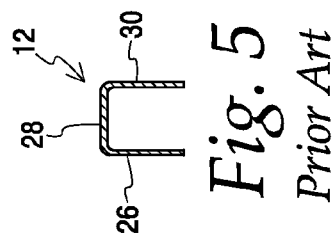
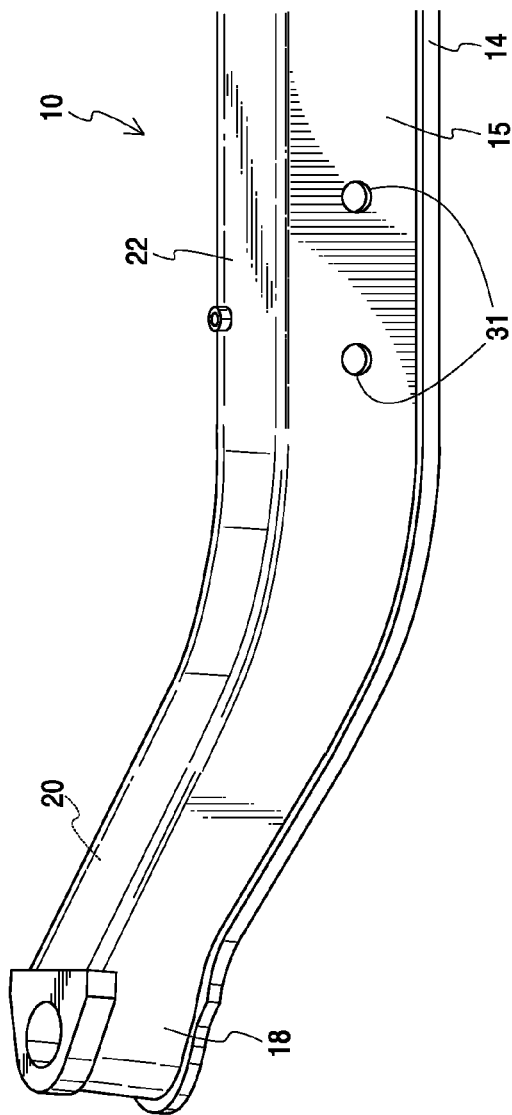
Fig. 3 Prior Art
Fig. 5 Prior Art
Fig. 4 Prior Art

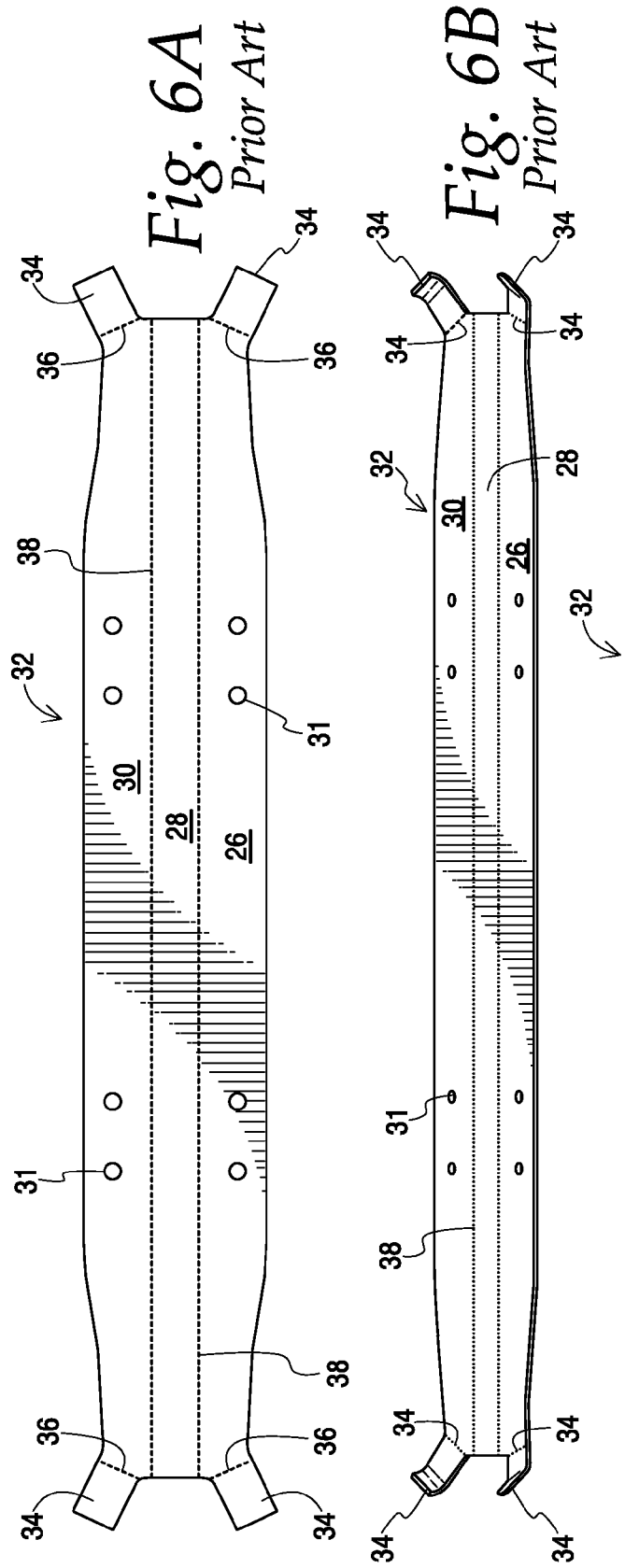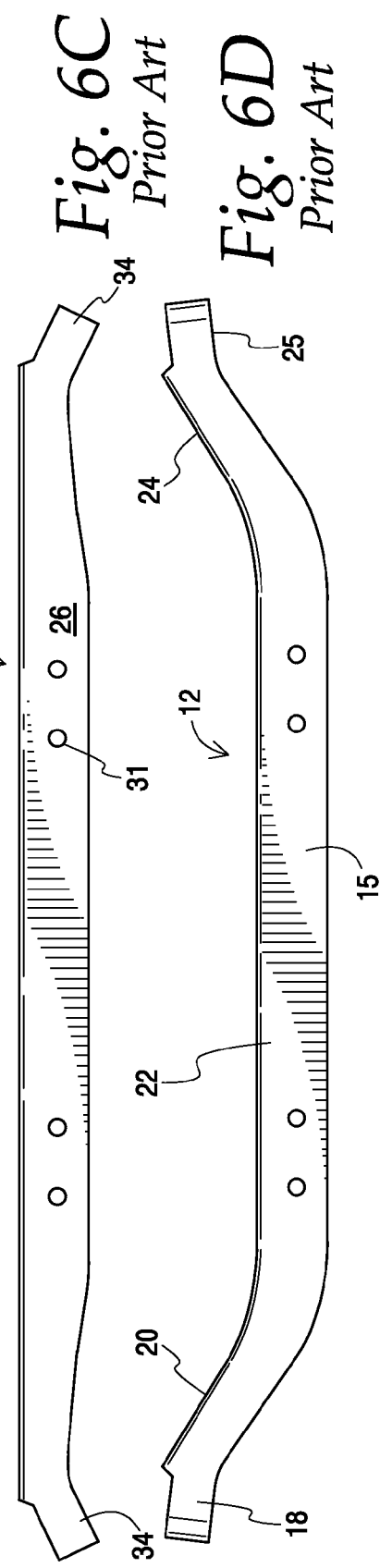

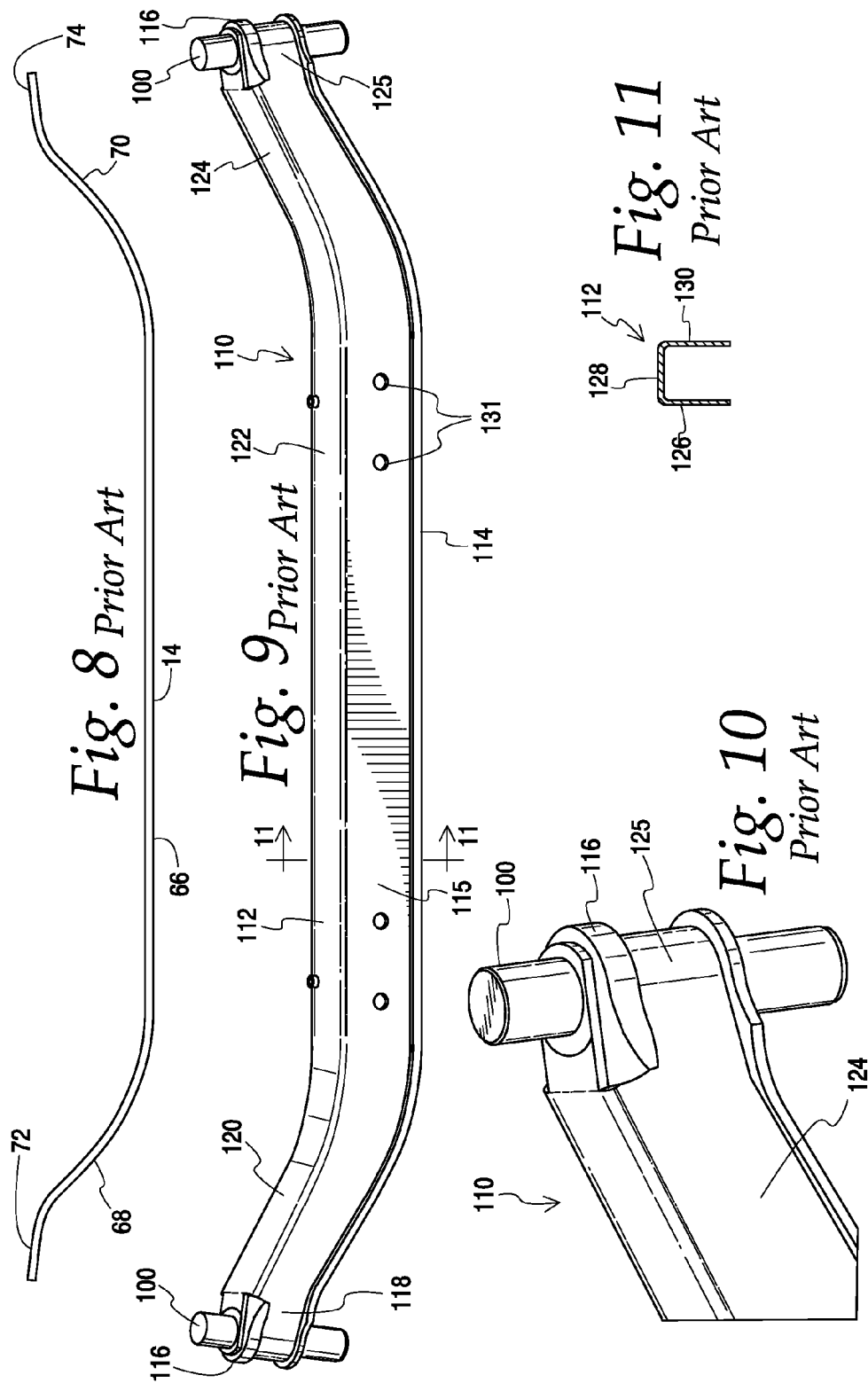

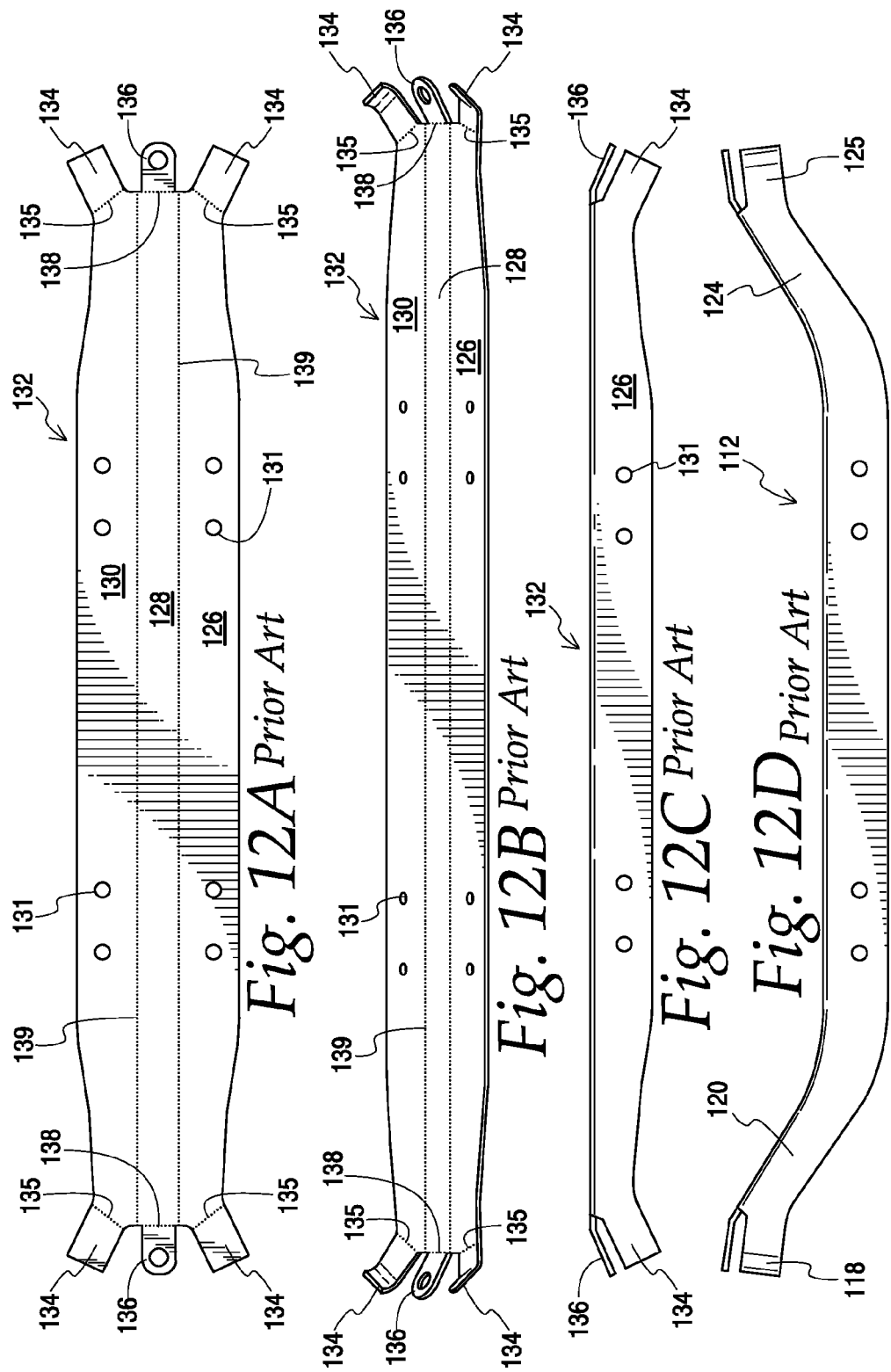

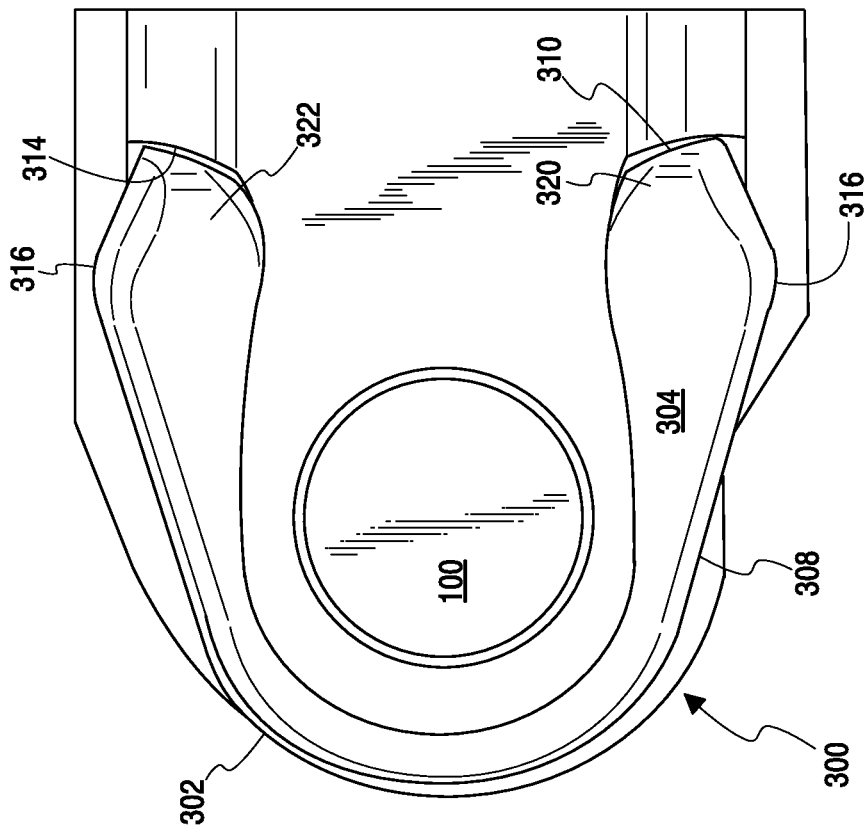
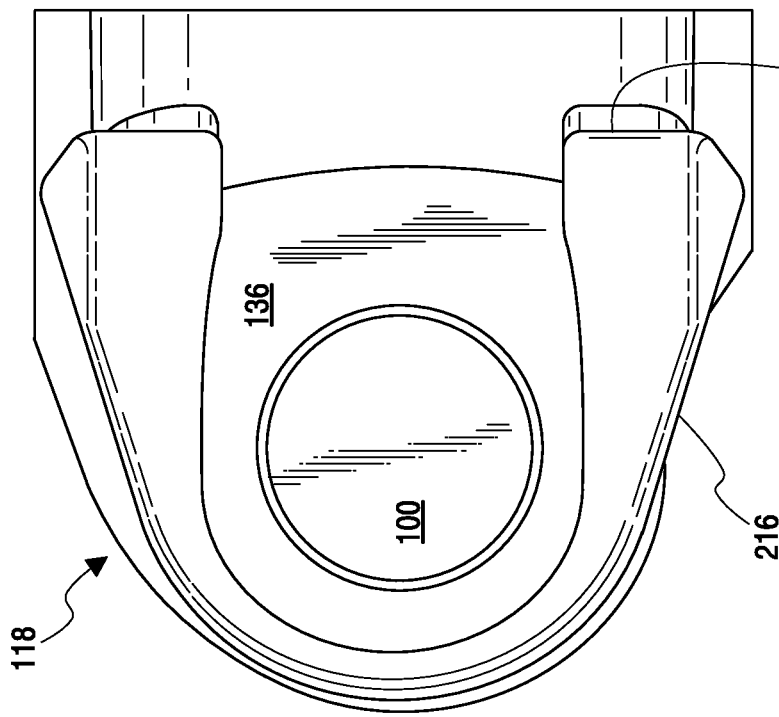

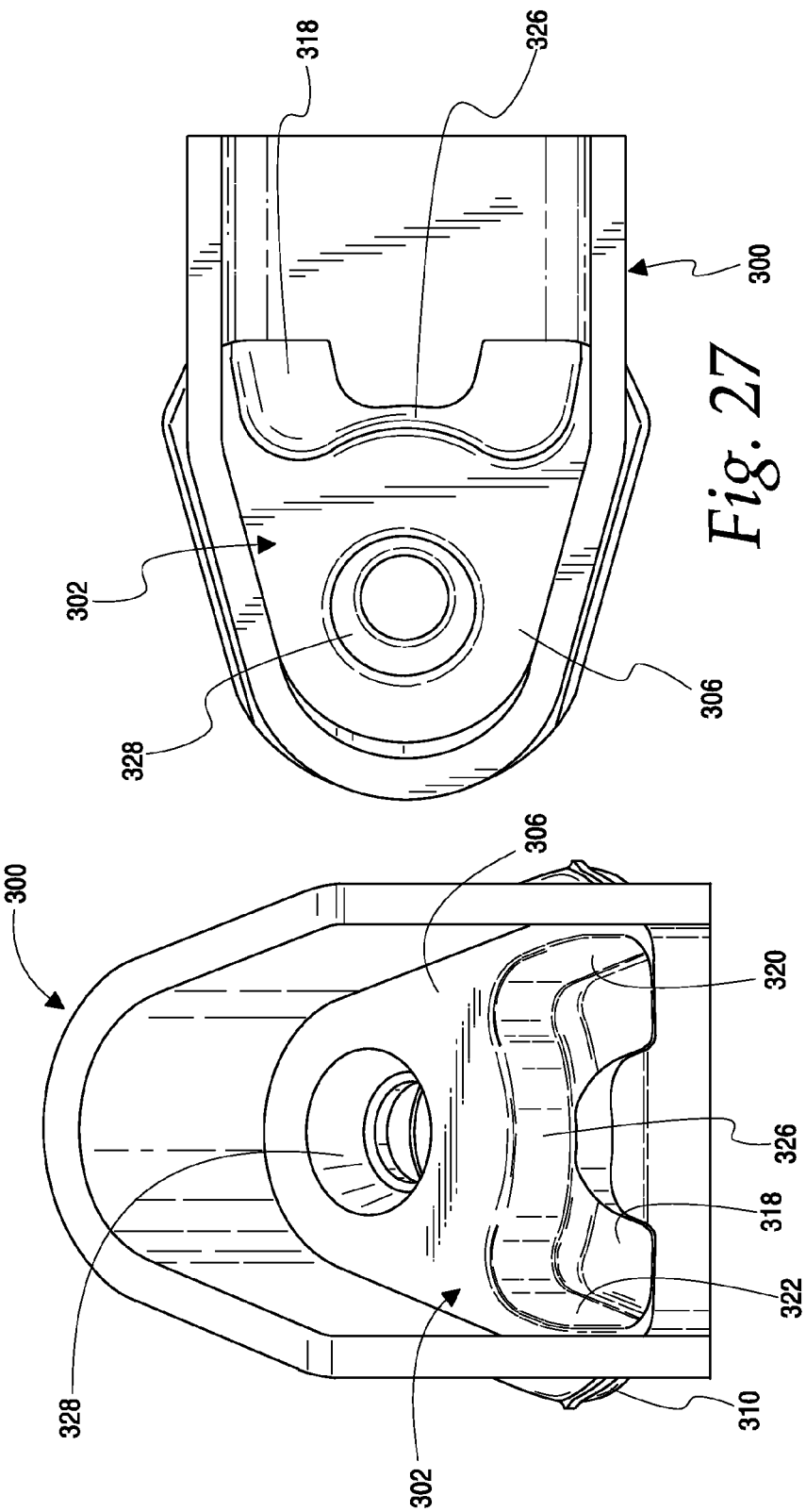

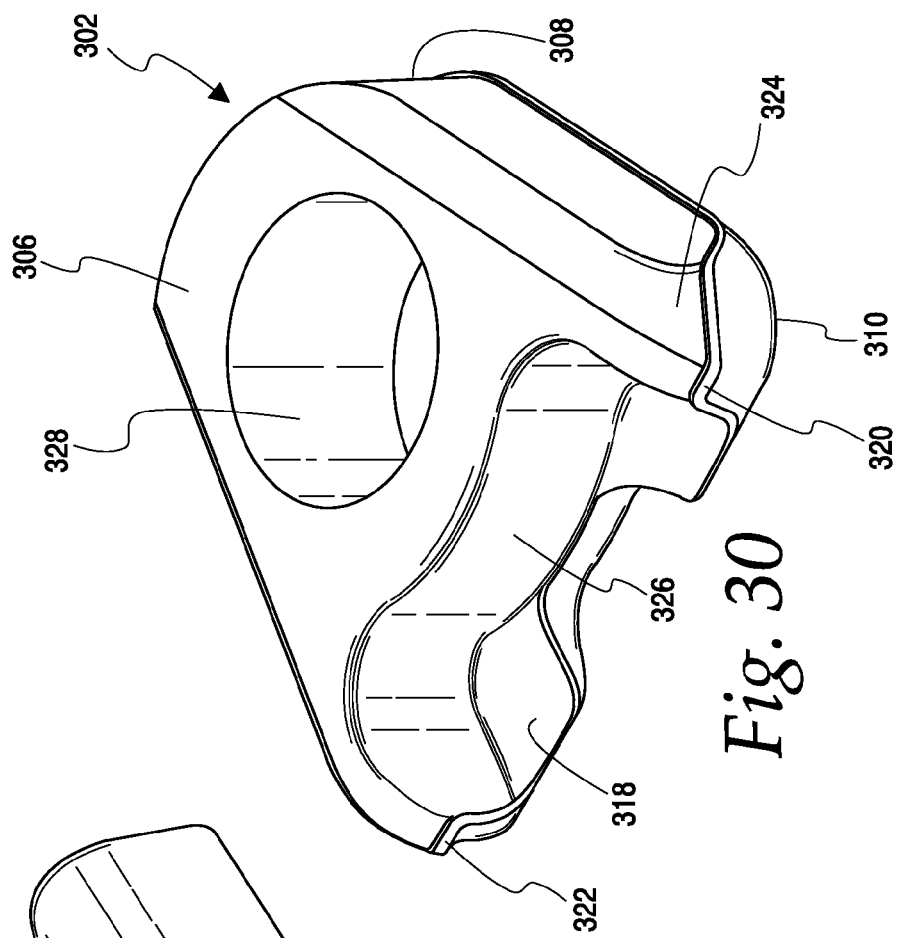
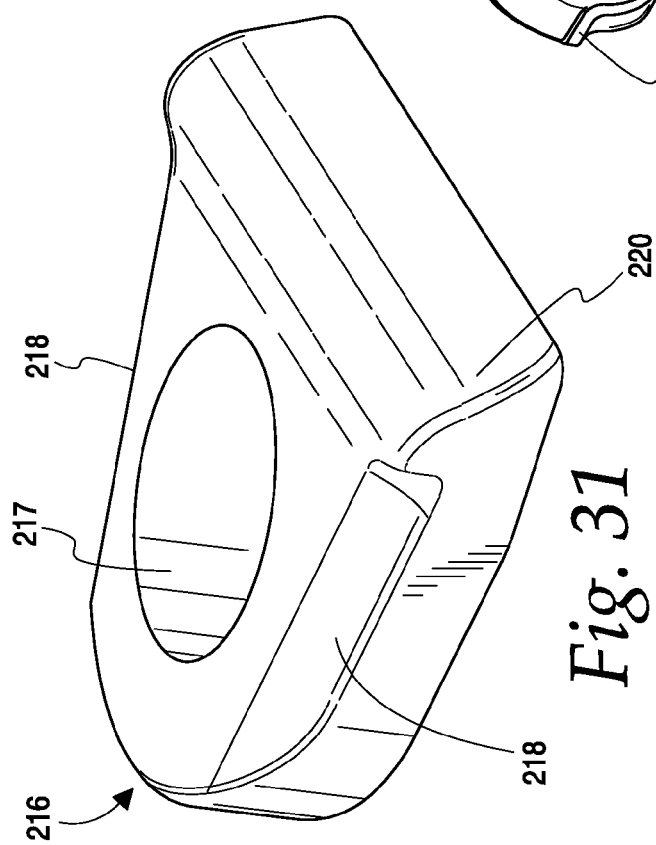

HEAD PLATE FOR VEHICLE AXLE

CROSS-REFERENCE TO RELATED APPLICATIONS

This application claims priority from and the benefit of provisional patent application Ser. No. 61/422,948, filed Dec. 14, 2010, which is hereby incorporated herein by reference.

BACKGROUND OF THE DISCLOSURE

The present subject matter relates generally to axles for vehicles and more particularly to head plates incorporated into axles for vehicles.

Typical steer axle assemblies for vehicles include a forged I-beam axle, and a pair of steering knuckles pivotally attached to opposite ends of the axle by way of king pins. Although they are generally strong and reliable, such forged I-beam axles are limited in their shape, are relatively heavy, and require a relatively large amount of machining. All of this translates into increased manufacturing and payload costs.

In view of the foregoing, fabricated axles have been developed. Such axles are typically manufactured from sheets of steel that are cut and then welded together. Fabricated axles generally weigh less than forged I-beam axles. For at least one known application, a forged I-beam steering axle for use with heavy-duty trucks weighs approximately one hundred ninety-five pounds, whereas an equivalent typical fabricated axle weighs approximately one hundred twenty-five pounds. In the case of commercial vehicles, including heavy-duty truck commercial vehicles, this translates into substantially increased payload capacity.

Another benefit of fabricated axles is that the material used (e.g., steel) can be spread around for more efficient distribution thereof. This can contribute to making the fabricated axle much lighter, and can even make it stiffer against both bending and torsion stresses. On top of all this, fabricated axles typically require less machining than forged I-beam axles. Accordingly, they are easier and less expensive to manufacture.

An example of a known fabricated axle is shown and described in U.S. Pat. No. 5,810,377, which is hereby incorporated herein by reference. The fabricated axle disclosed therein was a marked improvement over what was then the prior art and it is still useful for most purposes. However, it has now been recognized to have certain deficiencies. Principally, that fabricated axle does not utilize material optimally, causing increased costs in manufacture and material waste.

This disadvantage led to the development of further improved designs. For example, the fabricated axle shown and described in U.S. Pat. No. 6,609,764, which is hereby incorporated herein by reference, addressed many of said deficiencies. In particular, the axle described in U.S. Pat. No. 6,609,764 employs a main body formed from a rectangular blank, with only a small amount of the blank being wasted.

While the axle described in U.S. Pat. No. 6,609,764 successfully reduced the amount of waste material, it was not without its own disadvantages. For example, the main body of the axle is relatively short, thus requiring the attachment of a number of relatively heavy components, such as a pair of top king pin plates and gooseneck parts. Additionally, the multiplicity of components may increase manufacturing costs and complexity. For example, one manufacturing process is described as employing a three-pass weld to secure the various components to each other.

FIG. 1 illustrates a portion of yet another known fabricated vehicle axle A. The axle A includes a straight main body B having a U- or C-shaped cross-section and a continuous bottom plate P secured thereto. Separate goosenecks G (only one of which is illustrated) are welded to the ends of the main body B and to the bottom plate P. The goosenecks G are provided as cast components having a forked portion F, which provides an additional location by which to weld the gooseneck G to the main body B. In addition to their already heavy composition, the cast goosenecks G provide a relatively abrupt transition at the ends of the main body B, which further increases the weight of the axle A by requiring a three-pass weld to secure the gooseneck G and a portion of the main body B to the bottom plate P and rendering the material M under the gooseneck G redundant and effectively wasted.

FIG. 2 illustrates a portion of still another fabricated vehicle axle A'. This axle A' is described in U.S. patent application Ser. No. 12/046,722, filed Mar. 12, 2008, the full disclosure of which is hereby incorporated herein by reference. The axle A' includes a main body B' having a U- or C-shaped cross-section and a continuous bottom plate P' secured thereto. Main body B' includes a relatively elongated gooseneck portion G' and extends to the head of axle A'. A king pin fixture K having a substantially cylindrical shape is illustrated. King pin fixture K is secured to gooseneck portion G', thereby minimizing the size of the king pin fixture. This axle A' has the advantage of a simple cylindrical machined head that easily can be made solid for tapered king pin applications. Nonetheless, the axle A' (and particularly the kingpin fixture of axle A') may not be as robust as may be required for some applications.

It is desirable to overcome one or more of the foregoing shortcomings, or alternatively other shortcomings not specified herein but associated with prior fabricated axles.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a head plate is provided for incorporation into the head section of a vehicle axle. The head plate comprises top and bottom surfaces and a sidewall extending between the top and bottom surfaces. A back edge of the sidewall is configured to be connected to the head section and is rounded from the top surface to the bottom surface.

In another aspect, a head plate is provided for incorporation into the head section of a vehicle axle. The head plate comprises top and bottom surfaces and a sidewall extending between the top and bottom surfaces. A pocket is defined in the bottom surface and configured to be at least partially received within the head section.

BRIEF DESCRIPTION OF THE DRAWINGS

In the following detailed description, reference will frequently be made to the following views of the drawing, in which like reference numerals refer to like components, and in which:

FIG. 3 is a perspective view of a prior art vehicle axle of the type which may be used in combination with head plates according to the present disclosure;

FIG. 4 is a perspective view of a portion of the vehicle axle shown in FIG. 3;

FIG. 5 is a portion of a cross-sectional view of the vehicle axle shown in FIG. 3, taken along lines 5-5 thereof;

FIG. 6A is a plan view of material used to form the channel structure used to make the vehicle axle shown in FIG. 3;

FIG. 6B is an elevational view of the material shown in FIG. 6A after undergoing initial processing;

FIG. 6C is an elevational view of the material shown in FIG. 6B after undergoing further processing;

FIG. 6D is an elevational view of the material shown in FIG. 6C after undergoing further processing;

FIG. 8 is an edge view of the bottom plate structure used in the vehicle axle shown in FIGS. 3 and 9;

FIG. 9 is a perspective view of another prior art vehicle axle of the type which may be used in combination with head plates according to the present disclosure;

FIG. 10 is a perspective view of a portion of the vehicle axle shown in FIG. 9;

FIG. 11 is a portion of a cross-sectional view of the vehicle axle shown in FIG. 9, taken along lines 11-11 thereof;

FIG. 12A is a plan view of material used to form the channel structure used to make the vehicle axle shown in FIG. 9;

FIG. 12B is an elevational view of the material shown in FIG. 12A after undergoing initial processing;

FIG. 12C is an elevational view of the material shown in FIG. 12B after undergoing further processing;

FIG. 12D is an elevational view of the material shown in FIG. 12C after undergoing further processing;

FIG. 19 is a top plan view of the axle head portion and head plate shown in FIG. 17;

FIG. 23 is a top plan view of the axle head portion and head plate shown in FIG. 21;

FIGS. 25 and 26 are bottom perspective views of the axle head portion and head plate shown in FIG. 21;

FIG. 27 is a bottom plan view of the axle head portion and head plate shown in FIG. 21;

FIG. 30 is a bottom perspective view of the vehicle axle head plate of FIG. 21; and FIG. 31 is a bottom perspective view of the vehicle axle head plate of FIG. 14.

DESCRIPTION OF THE ILLUSTRATED EMBODIMENTS

Figure 2:
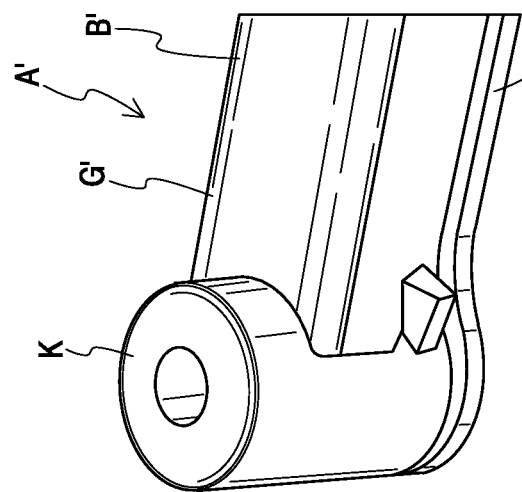
FIG. 2 is a perspective view of a portion of another prior art vehicle axle.
Figure 1:
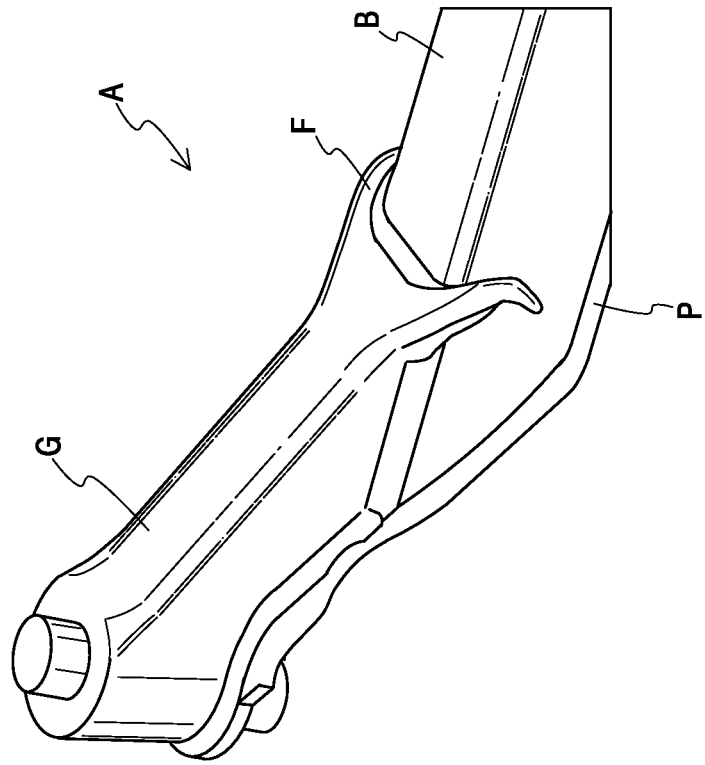
FIG. 1 is a perspective view of a portion of a prior art vehicle axle.

The embodiments disclosed herein are for the purpose of providing the required description of the present subject matter. These embodiments are only exemplary. Specific details disclosed herein are not to be interpreted as limiting the subject matter as defined in the accompanying claims, unless such details are expressly recited in the claims.

FIG. 3 illustrates a fabricated vehicle axle generally designated 10. Axle 10 includes a channel 12 and a bottom plate 14 together forming a main body 15. Axle 10 also has first and second end (head) sections 18, 25 at each end thereof. A head plate 16 is positioned at each head section 18, 25 of axle 10. Channel 12, bottom plate 14 and the head plates 16 are secured together, for example by welding operations, along their respective points and lines of intersection. Channel 12, bottom plate 14 and head plates 16 may be made from a variety of suitable materials, such as high-strength low alloy ("HSLA") steel.

The main body 15 has a first gooseneck section 20, a midsection 22, and a second gooseneck section 24. FIG. 4 illustrates the first head section 18 of axle 10 and the first gooseneck section 20 and part of midsection 22 of main body 15.

Referring to FIG. 5, channel 12 has an inverted U-shaped vertical cross-section at those portions thereof associated with the midsection 22 and the first and second gooseneck sections 20, 24 of main body 15. As shown, channel 12 includes a front wall 26, a top wall 28 and a rear wall 30. Front and rear walls 26, 30 include axle seat bolt holes 31 to permit mounting of an axle seat for suspension components (see FIGS. 3 and 4). It will be noted that FIG. 5 does not show bottom plate 14.

As used herein, the term "U-shaped" is used broadly and is not limited to the illustrated configuration of channel 12 having a pair of downwardly extending front and rear walls 26, 30 that are generally perpendicular to a top wall 28. Other configurations within the scope of that term may include, for example, downwardly extending walls or legs that are inclined with respect to a top wall or curved to provide a generally C-shaped cross-section.

FIGS. 6A-6D illustrate four progressive steps for forming channel 12. FIG. 6A illustrates a first step wherein a flat 32 is cut or otherwise removed from a rectangular blank of material. As shown, flat 32 includes front wall 26, top wall 28 and rear wall 30. Axle seat bolt holes 31 may be formed in the front and rear walls 26, 30 of flat 32. The flat 32 is shaped to include tab-like end extensions 34 extending from each end of each of the front and rear walls 26, 30. End extensions 34 may be bent upward along bend lines 36 to the configuration of FIG. 6B.

Flat 32 is preferably built into the rectangular blank of material, as described. This eliminates the need to trim the bottom edge of channel 12 once it is bent and formed to mate with bottom plate 14. Laser or machining this profile after bending would require costly equipment and take considerable time.

FIG. 6C illustrates a third step for forming channel 12 wherein flat 32 illustrated in FIG. 6B is bent along bend lines 38 illustrated therein. Coincidental with this bending of flat 32, each end of channel 12 is closed off by its proximate end extensions 34, namely the proximate end extension for front wall 26 and the proximate end extension for rear wall 30.

FIG. 6D illustrates a fourth step for forming channel 12 wherein the channel is further bent upwards at its end portions so that it assumes an inverted gull-wing type shape when viewed from the front or rear. In this step, channel 12 is formed to define the portions thereof associated with the upwardly and outwardly extending gooseneck sections 20, 24 of main body 15 and the primarily outwardly extending head sections 18, 25 of axle 10 (see also FIGS. 3 and 4). The portions of channel 12 associated with the gooseneck sections 20, 24 of main body 15 are substantially identical to each other and separated by a portion of the channel associated with the generally straight midsection 22 of the main body (see also FIGS. 3 and 4).

This fourth step for forming channel 12 may be carried out by a number of beam-bending or rolling techniques, or other forming methods. Methods that may be used include: (1) stamping in a male/female die set contoured to the final shape, (2) using a press brake with side bolsters to inhibit side wall deformation, (3) fluid cell (bag) press, (4) roll forming, (5) stretch forming, and (6) hydroforming.

In one exemplary method for forming channel 12 as illustrated in FIG. 6D, channel 12 is placed over a multi-piece mandrel so that the mandrel is inserted into the open end (bottom) of channel 12. The mandrel includes three pieces, with two of the pieces being relatively short end pieces (corresponding to the portions of channel 12 associated with gooseneck sections 20, 24 of main body 15) and the third being a longer central piece (corresponding to the portion of the channel associated with midsection 22 of the main body). The mandrel pieces are arranged end-to-end and generally prevent channel 12 from deforming inwardly during the forming process.

Each outer end of the end mandrel pieces is carried by a stationary support, with each inner end thereof being carried by an associated resilient support. Resilient supports also support the ends of the central mandrel piece. The resilient supports may be variously provided, such as deformable pads or hydraulic/air cylinders or the like. Resilient supports allow for pivoting of the end mandrel pieces (i.e., downward relative movement of the inner ends of the end mandrel pieces with respect to the outer ends thereof). A pivot mechanism is associated with each end mandrel piece to further facilitate such pivoting action. The pivoting action allows the end mandrel pieces to generally follow the shape of the portions of channel 12 associated with the gooseneck sections 20, 24 of main body 15 during the forming process.

A forming or radius die is provided above channel 12, the mandrel pieces, and supports. The forming die has an inverted U-shaped cross-section that defines a channel for receiving channel 12. The sides of this channel are defined by side bolsters that generally conform to the downwardly extending front and rear walls 26, 30 of channel 12 and prevent the walls from bowing outwardly in the bend-effected zones during the process, thereby preserving a substantially uniform width along channel 12. The top portion of this channel is pressed into contact with top wall 28 of channel 12 by a punch and is shaped like the final curvature of channel 12. Due to material springback, the actual curvature of the gooseneck portions typically has a slightly greater radius of curvature than that of the punch, which may be considered when designing the tooling.

In use, the mandrel pieces are placed on the supports and channel 12 is positioned on the mandrel pieces. The forming die is then moved downwardly to contact channel 12. The contoured top portion of the forming die channel forces the center portion of channel 12 downwardly as the resilient supports move downwardly to allow for such movement. The stationary supports maintain the end portions of channel 12 at a higher elevation, thereby forcing the channel to bend in the areas between the stationary supports and the adjacent resilient support. The end mandrel pieces pivot about the associated pivot mechanism to allow for this bending of channel 12. The presence of the mandrel and the side bolsters prevents the bent portions of channel 12 from deforming inwardly or outwardly, thereby maintaining the U-shaped cross-section of the channel at the bent portions thereof associated with gooseneck portions 20, 24 of main body 15 during and after forming. In this method, the entire channel 12 is formed in a single (one hit) operation.

In another exemplary method for forming channel 12 as illustrated in FIG. 6D, each end portion of the channel is formed separately. This method requires two operations (or hits), one for each end portion of channel 12. Because each end portion of the channel is formed independently, each end portion may be adjusted as desired. The tooling for this method is substantially less expensive than the tooling for the aforementioned forming method.

Figure 7:
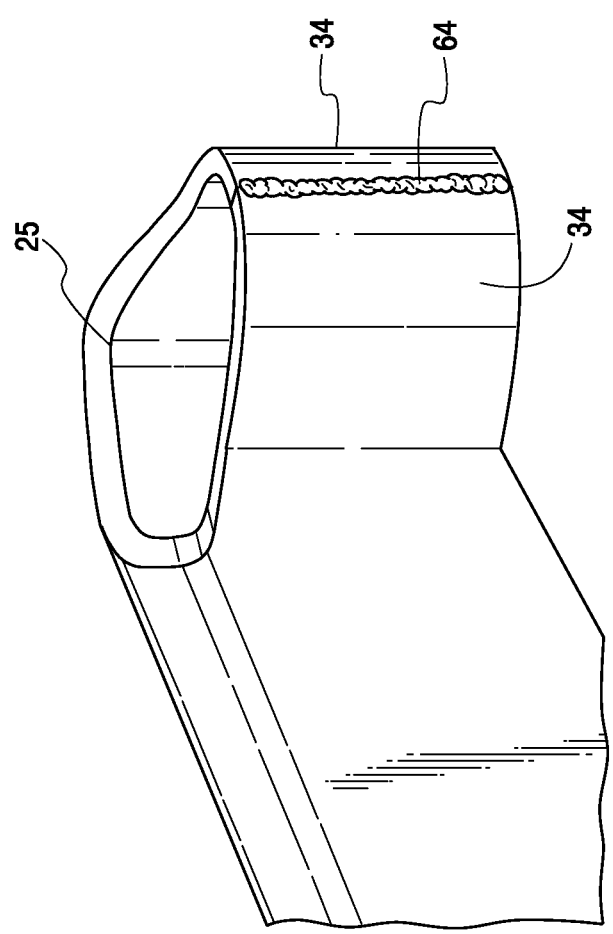
FIG. 7 is a perspective view of a portion of the channel structure used in the vehicle axle shown in FIG. 3.

FIG. 7 illustrates one end of channel 12 at its head portion 25 and, particularly, the end wrap formed at that end of the channel. During the channel forming step illustrated by FIG. 6C, end extensions 34 are wrapped around and joined together along a vertically extending weld seam 64 to define the head portion 25 of channel 12. As such, an opening is formed, and a king pin (not shown) may extend through this opening. The weld seam 64 joining end extensions 34 is preferably positioned at the far end of axle 10, as shown, where operational stresses are at a minimum.

FIG. 8 illustrates the bottom plate 14 of the fabricated axle 10. The bottom plate 14 is provided as a rectangular strip of material that is formed (e.g., by bending) to provide a substantially flat body portion 66 associated with the midsection 22 of main body 15, upwardly and outwardly extending gooseneck portions 68, 70 associated with the first and second gooseneck sections 20, 24 of the main body, and primarily outwardly extending head portions 72, 74 associated with the first and second end sections 18, 25 of the axle. Bottom plate 14 generally matches the contour of channel 12 and is welded thereto, as shown in FIGS. 3 and 4, to form the box-like section of main body 15. Bottom plate 14 is preferably slightly wider than channel 12 to provide a convenient welding surface. Large bend radii on bottom plate 14 eliminate stress concentrations and improve the durability of the welds joining channel 12 to the bottom plate.

Still referring back to FIGS. 3 and 4, it will be appreciated that a king pin bore is machined through each head plate 16, as shown. Similarly, king pin bores are machined through the head portions 72, 74 of bottom plate 14. The king pin bores at each head section 18, 25 of axle 10 are aligned. The height at each head section 18, 25 of axle 10 is smaller than prior axle head configurations, allowing shorter king pins and steering knuckles to be used and permitting ample space for air disc brake packaging.

FIG. 9 illustrates another fabricated vehicle axle of U.S. patent application Ser. No. 12/874,982, generally designated 110. Axle 110 includes a channel 112 and a bottom plate 114 together forming a main body 115. Axle 110 also has first and second end (head) sections 118, 125 at each end thereof. A head plate 116 is positioned at each head section 118, 125 of axle 110. Channel 112, bottom plate 114 and the head plates 116 are secured together, for example by welding operations, along their respective points and lines of intersection. As described further herein, the head plates 116 are sandwiched within channel 112 at opposite end sections 118, 125 of the axle. Channel 112, bottom plate 114 and head plates 116 may be made from a variety of suitable materials, such as HSLA steel.

The main body 115 has a first gooseneck section 120, a midsection 122, and a second gooseneck section 124. FIG. 10 illustrates head section 125 of axle 110 and the second gooseneck section 124 of the main body. Preferably, the entire mating surface between the channel 112 and the head plate 116 is welded, including the top surface, bottom surface and back edge of the head plate.

Also illustrated in FIG. 10 is a king pin 100 in its desired position to permit mounting of a steering knuckle (not shown). King pins 100 are likewise illustrated in FIG. 9.

FIG. 11 illustrates channel 112 as having an inverted U-shaped vertical cross-section at those portions thereof associated with the midsection 122 and the first and second gooseneck sections 120, 24 of main body 115. Channel 112 includes a front wall 126, a top wall 128 and a rear wall 130. Front and rear walls 126, 130 include axle seat bolt holes 131 (FIG. 9) to permit mounting of an axle seat for suspension components. It will be appreciated that FIG. 11 does not show bottom plate 114.

FIGS. 12A-12D illustrate four progressive steps for forming channel 112. FIG. 12A illustrates a first step wherein a flat 132 is cut or otherwise removed from a rectangular blank of material. As shown, flat 132 includes front wall 126, top wall 128 and rear wall 130. Axle seat bolt holes 131 may be cut or formed in flat 132. The flat 132 is shaped to include tab-like end extensions 134 extending from each end of each of the front and rear walls 126, 130. End extensions 134 may be bent upward along bend lines 135 to the configuration of FIG. 12B.

Figure 13:
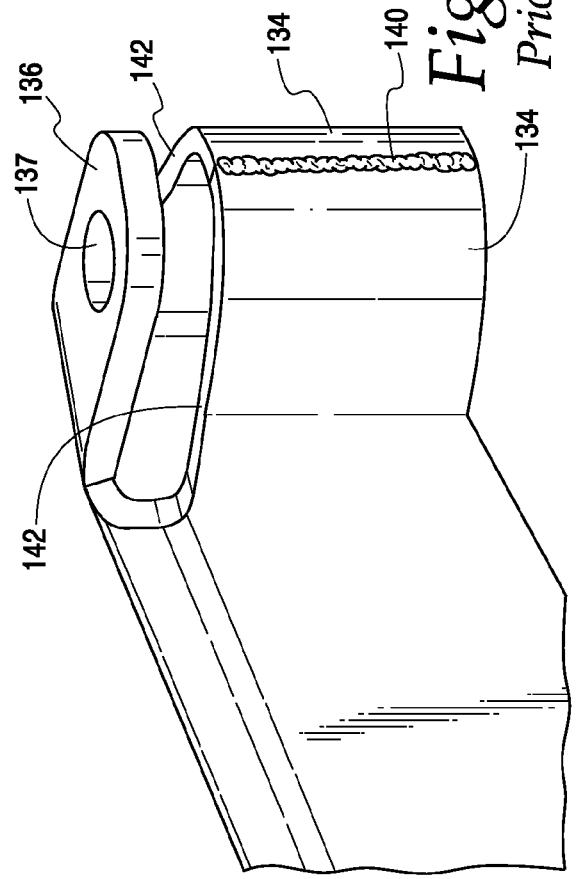
FIG. 13 is a perspective view of a portion of the channel structure used in the vehicle axle shown in FIG. 9.

Flat 132 is also shaped to include tab-like extensions 136 extending from each end of the top wall 128. As further described herein, tab-like extensions 136 correspond to axle head cover flaps for axle 110. King pin holes 137 may be formed in flat 132 within each tab-like extension 136, as shown in FIG. 13. Tab-like extensions 136 may be bent upward along bend lines 138 to the configuration of FIG. 12B.

Flat 132 is preferably built into the rectangular blank of material, as described. This eliminates the need to trim the bottom edge of channel 112 once it is bent and formed to mate with bottom plate 114. Laser or machining this profile after bending would require costly equipment and take considerable time.

FIG. 12C illustrates a third step for forming channel 112 wherein flat 132 illustrated in FIG. 12B is bent along bend lines 139 illustrated therein. During this bending of flat 132, each end of channel 112 is closed off by its proximate end extensions 134, namely the proximate end extension for front wall 126 and the proximate end extension for rear wall 130. Each end of channel 112 is also covered by its proximate extension 136 serving as a cover flap for the channel end.

FIG. 12D illustrates a fourth step for forming channel 112 wherein the channel is further bent upwards at its end portions so that it assumes an inverted gull-wing type shape when viewed from the front or rear. In this step, channel 112 is formed to define the portions thereof associated with the upwardly and outwardly extending gooseneck sections 120, 124 of main body 115 and the primarily outwardly extending head sections 118, 125 of axle 110 (see also FIGS. 9 and 10). The portions of channel 112 associated with the gooseneck sections 120, 124 of main body 115 are substantially identical to each other and separated by a portion of the channel associated with the generally straight midsection 122 of the main body (see also FIGS. 9 and 10).

This fourth step for forming channel 112 may be carried out by a number of beam-bending or rolling techniques, or other forming methods, including those techniques and methods already described herein.

FIG. 13 illustrates one end of channel 112 at its head portion and, particularly, the end wrap and cover flap formed at that end of the channel. During the channel forming step illustrated by FIG. 12C, end extensions 134 are wrapped around and joined together along a vertically extending weld seam 140. In addition, extension 136 folds down and forms a cover flap for the end of the channel. In the illustration, extension 136 covers the top of the channel end. Extension 136 extends generally parallel to the upper edges 142 of the joined end extensions 134. There is a space between the bottom surface of the cover flap formed by extension 136 and the upper edges 142 of end extensions 134. This configuration defines the head portion of channel 112. In this configuration, a king pin (not shown) may extend through king pin hole 137 and the opening formed by end extensions 134. The weld seam 140 joining end extensions 134 is preferably positioned at the far end of axle 110, as shown, where operational stresses are at a minimum.

The bottom plate 114 of the fabricated axle 110 (FIG. 15) may have the form of bottom plate 14 illustrated in FIG. 8. The bottom plate 114 is provided as a rectangular strip of material that is formed (e.g., by bending) to provide a substantially flat body portion (illustrated as 66 in FIG. 8) associated with the midsection 122 of main body 115, upwardly and outwardly extending gooseneck portions (illustrated as 68 and 70 in FIG. 8) associated with the first and second gooseneck sections 120, 124 of the main body, and primarily outwardly extending head portions (illustrated as 72 and 74 in FIG. 8) associated with the first and second end sections 118, 125 of the axle. Bottom plate 114 generally matches the contour of channel 112 and is welded thereto, as shown in FIGS. 9 and 10, to form the box-like section of main body 115. Bottom plate 114 is preferably slightly wider than channel 112 to provide a convenient welding surface. Large bend radii on bottom plate 114 eliminate stress concentrations and improve the durability of the welds joining channel 112 to the bottom plate.

Figure 14:
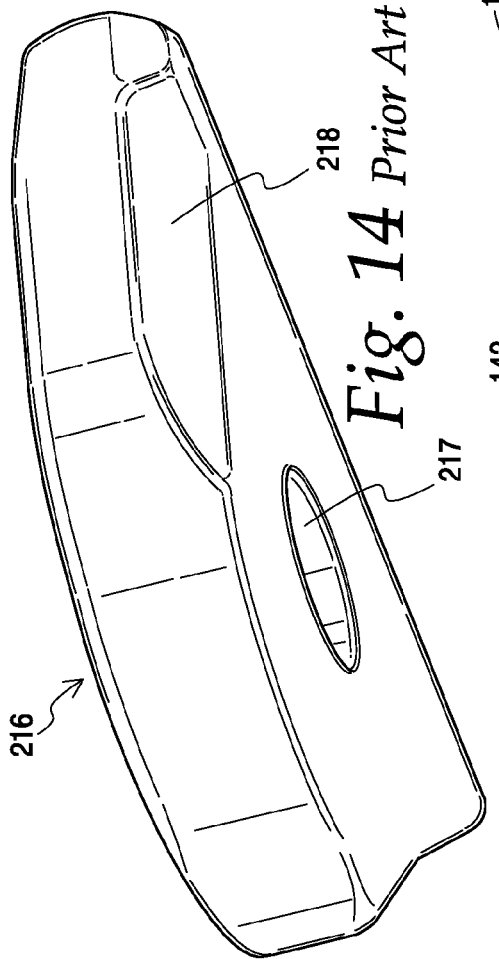
FIG. 14 is a perspective view of a prior art vehicle axle head plate.

FIG. 14 illustrates a prior art head plate 216 for use with axle 110. Head plate 216 may also be used with axle 10 and other axles, where appropriate.

Head plate 216 includes a hole 217 to permit a king pin to extend through it. Head plate 216 also includes angled or chamfered surfaces forming side chamfers 218 that facilitate higher penetration welds to maximize the strength at the interface between the head plate and channel 112. It will be appreciated that while only one of the side chamfers 218 is illustrated in FIG. 14 at one side of head plate 216, another side chamfer is formed into the opposite side of the head plate.

Side chamfers 218 are formed into head plate 216 to allow portions of the upper edges 142 of channel end extensions 134 (shown in FIG. 13) to project slightly radially outwardly from head plate 216. Those portions of upper edges 142 are exposed and form shelves that allow more weld metal to be deposited during the welding process. This additional weld metal strengthens the interface between head plate 216 and channel 112.

Figure 15:
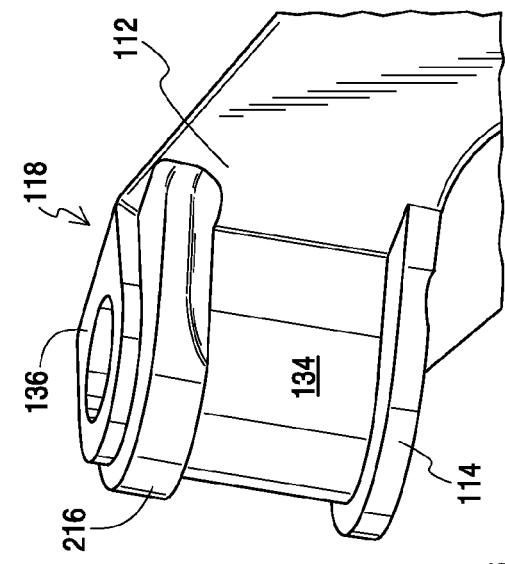
FIG. 15 is a perspective view of a portion of a vehicle axle using the head plate shown in FIG. 14.

FIG. 15 illustrates an axle head portion 118 wherein the head plate 216 is used. A portion of the proximate gooseneck portion for the axle is also illustrated. The axle head portion 118 includes channel 112 welded to bottom plate 114. As previously described, channel 112 is closed off by the end extensions 134 and the cover flap 136. Head plate 216 is positioned within the space between the bottom surface of cover flap 136 and the upper edges 142 of the end extensions (see also FIG. 13). As noted, use of head plate 216 provides for greater integrity of the interface between the head plate and channel 112, which in turn produces a more reliable axle head portion.

Figure 29:
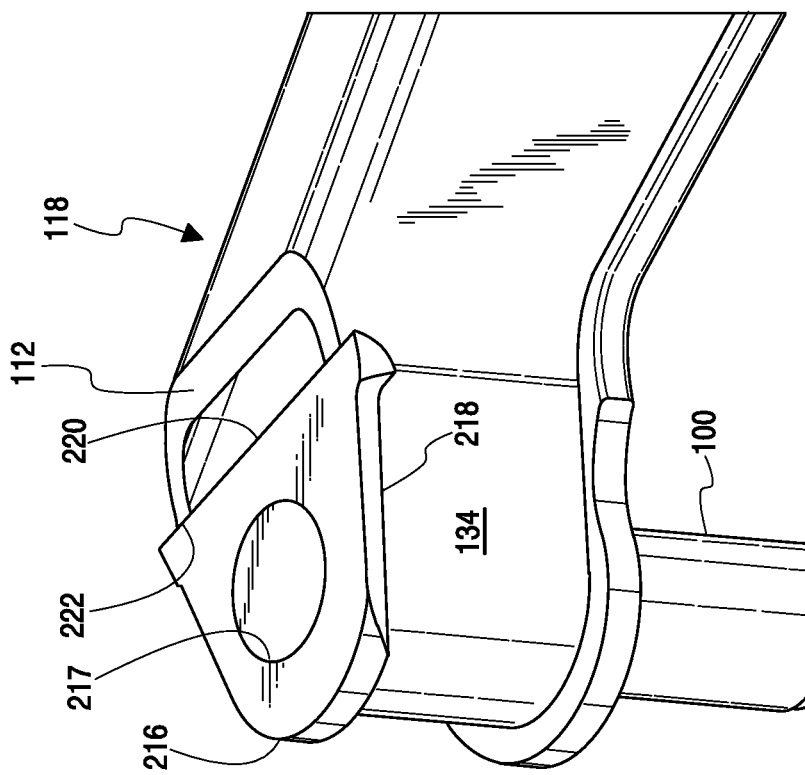
FIG. 29 is a cross-sectional perspective view of the axle head portion and head plate shown in FIG. 17.

The head plate 216 and associated axle head portion 118 are further illustrated in FIGS. 16-19. While the illustrated head plate 216 and axle head portion 118 are suitable for their intended purpose, there are some aspects of them which could be modified to some advantage. For example, the back edge 220 of the head plate 216 has a straight, "knife edge" configuration (FIG. 18) and the axle head portion 118 a matching surface 222, which may give rise to stress concentrations. In particular, the "knife edge" design may cause the loading from the kingpin 100 as it transitioned into the axle head portion 118 to create a point load condition at the knife edge 220, which is located at a weld root. The concentration of the point loading at the weld root may result in a fatigue performance that could be improved. Additionally, as shown in FIG. 29, the head plate 216 is relatively wide across the interface with the channel 112, which may cause a high stiffness gradient change from the thin channel wall to the wide head plate back edge 220 and a concentrated load at the weld root in that area, which it may be desirable to avoid or minimize.

Figure 20:
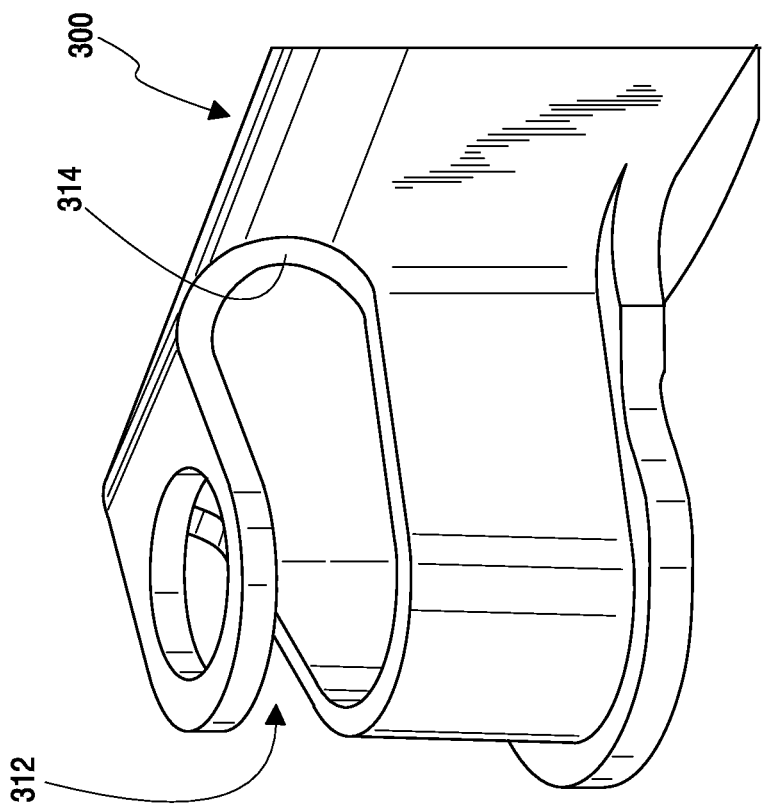
FIG. 20 is a perspective view of an axle head portion according to an aspect of the present disclosure.
Figure 16:
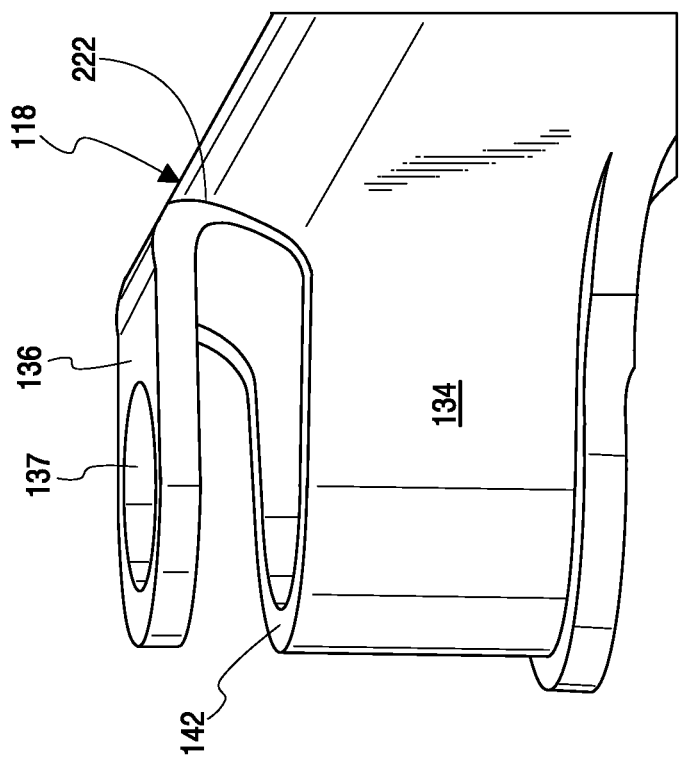
FIG. 16 is a perspective view of the axle head portion of FIG. 13.
Figure 21:
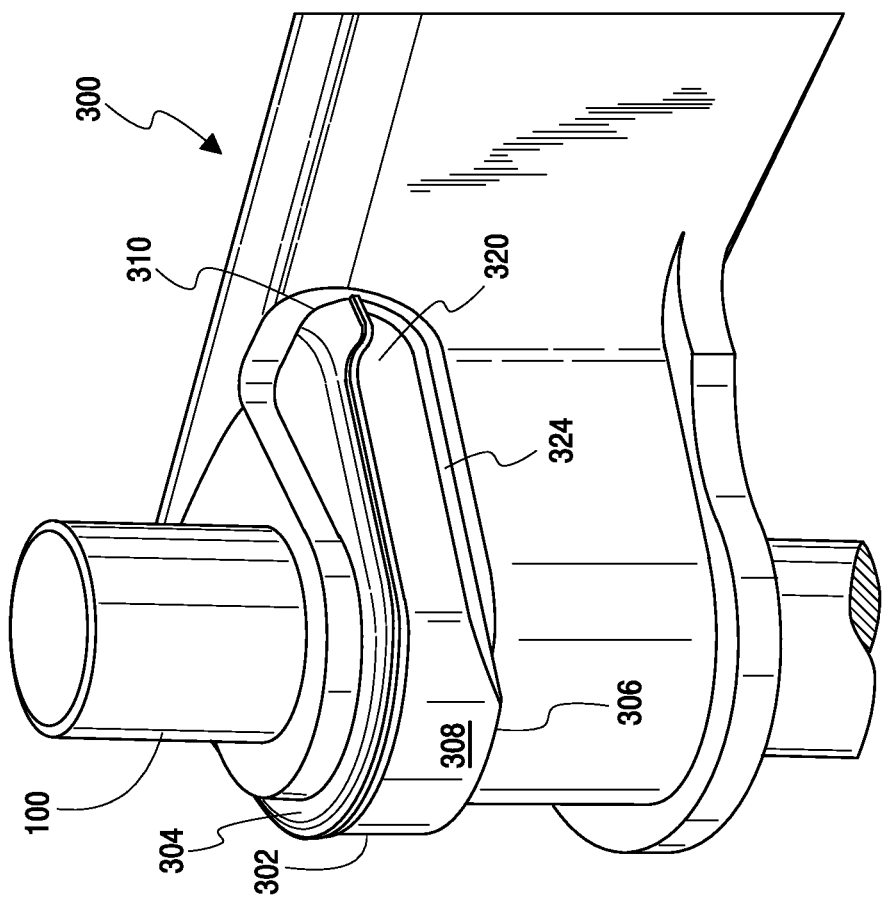
FIG. 21 is a perspective view of the axle head portion of FIG. 20 using a head plate according to an aspect of the present disclosure.
Figure 17:
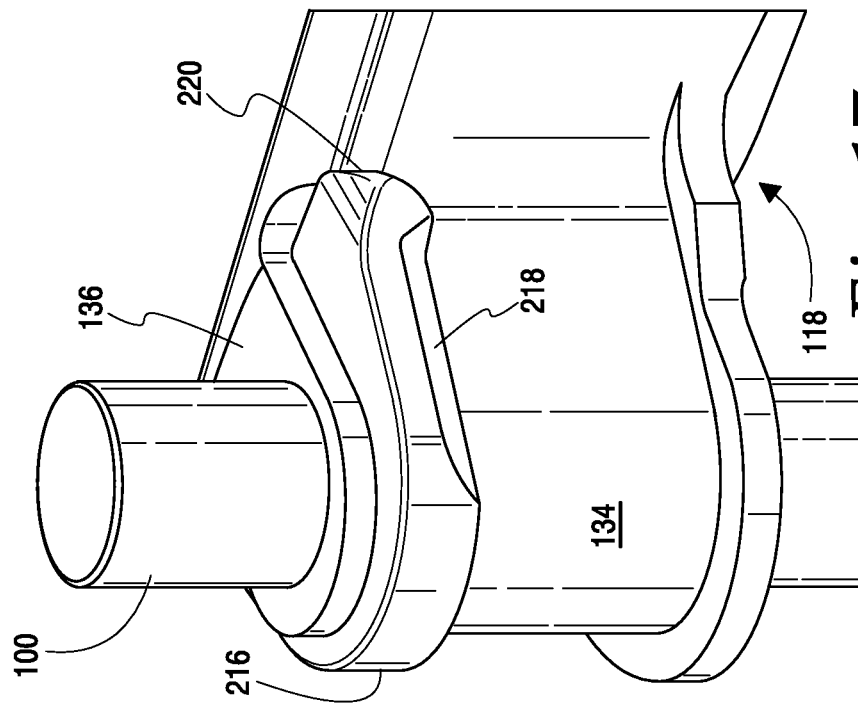
FIG. 17 is a perspective view of the axle head portion of FIG. 16 using the head plate shown in FIG. 14.
Figure 22:
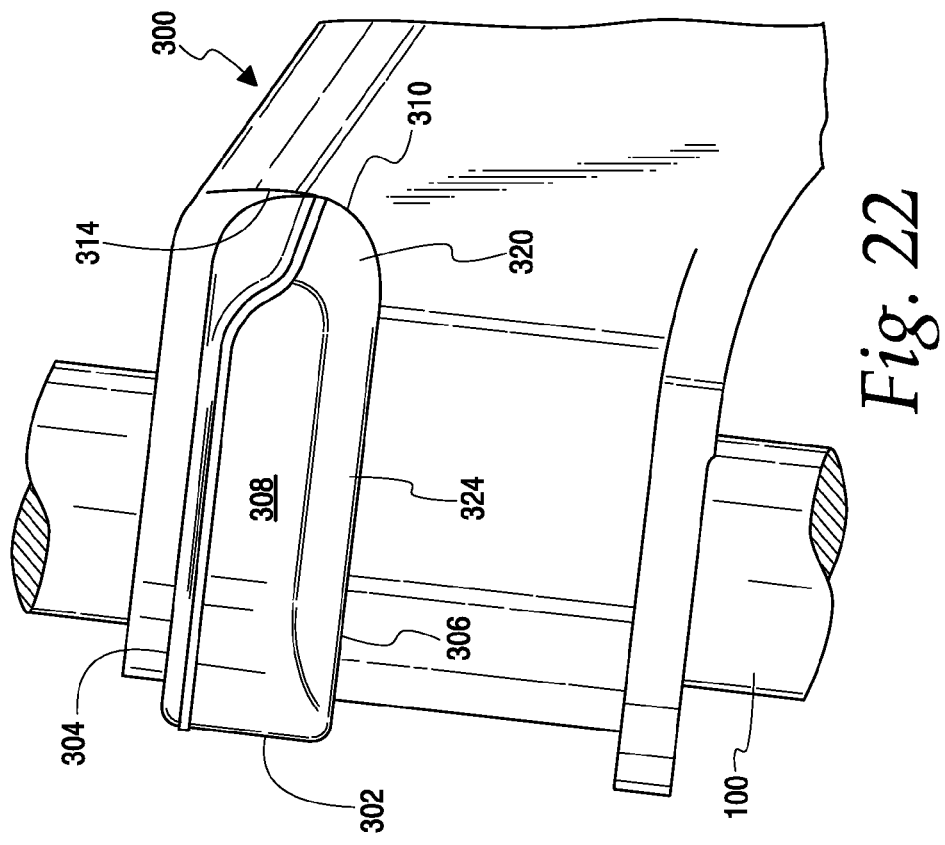
FIG. 22 is an elevational view of the axle head portion and head plate shown in FIG. 21.
Figure 18:
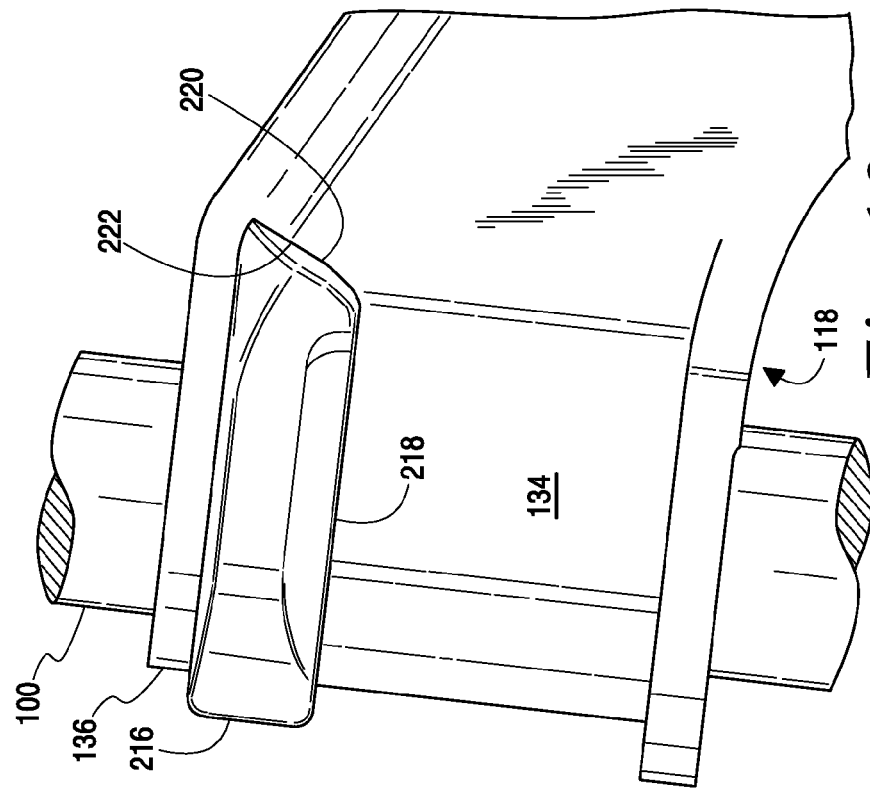
FIG. 18 is an elevational view of the axle head portion and head plate shown in FIG. 17.
Figure 25:
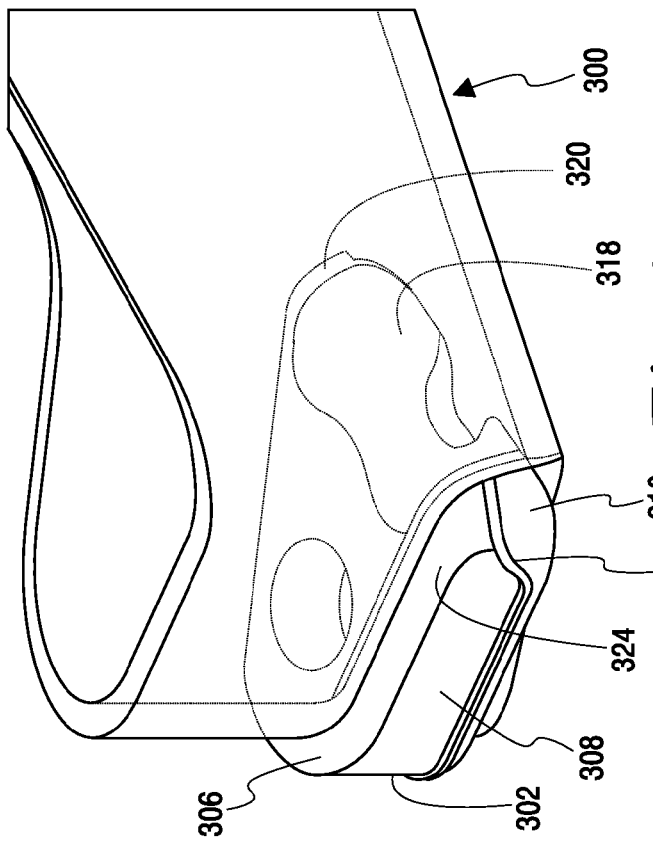
Figure 24:
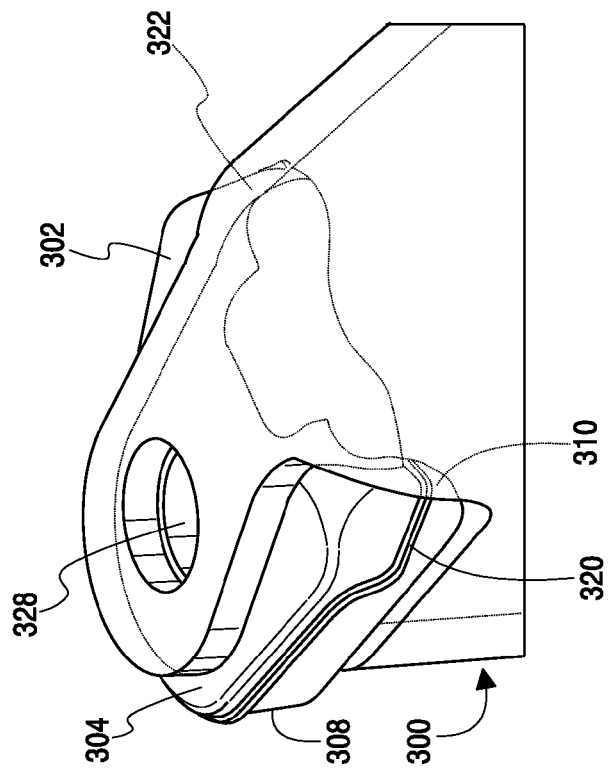
FIG. 24 is a rear perspective view of the axle head portion and head plate shown in FIG. 21.

FIG. 20 shows an axle head portion or section 300, while FIGS. 21-27 show the axle head portion 300 and an associated head plate 302 which represent an alternative to the head plate 216 and axle head portion 118 of FIGS. 13-19. The head plate 302 and axle head portion 300 of FIGS. 21-27 may be preferred because there is a smoother or more gradual or continuous interface between the head plate 302 and the axle head portion 300. In particular, the head plate 302 has a top surface 304 and a bottom surface 306 (shown in greater detail in FIG. 30), with a sidewall 308 extending therebetween. In the illustrated embodiment, the sidewall 308 has a back edge 310 which is rounded from the top surface 304 to the bottom surface 306 (FIG. 22), as opposed to being a straight "knife edge" surface (FIG. 18). A smoother or more gradual or continuous interface, such as the illustrated rounded configuration, eliminates stress concentrations and also provides a more optimized path for applying weld metal during assembly. The illustrated rounded or "coped" head plate surface also enhances the performance of the axle in lateral fatigue.

In the illustrated embodiment, the head plate 302 has generally planar top and bottom surfaces 304 and 306 which are parallel. The illustrated rounded back edge 310 defines a substantially semi-circular shape with an upper portion which is substantially tangential with the top surface 304 and a lower portion which is substantially tangential with the bottom surface 306. Other rounded configurations (e.g., a generally parabolic or oblong configuration) or configurations having rounded features (e.g., a generally square-shaped back edge with rounded corners) may also be employed without departing from the scope of the present disclosure. The illustrated back edge 310 has a number of advantageous properties (e.g., it substantially eliminates any discontinuities and point-loading in the weld between the head plate 302 and the axle head portion 300, thereby better distributing loads and increasing the security of the connection), but it is merely exemplary and other configurations may also be employed without departing from the scope of the present disclosure.

To accommodate the rounded back edge 310 of the head plate 302, the open mouth 312 of the axle head portion 300 may include a rounded surface 314 (FIG. 20) which substantially matches at least a portion of the curvature of the rounded back edge 310 of the head plate 302 (FIG. 22) when the back edge 310 is received within the open mouth 312 of the axle head portion 300. Head plates according to the present disclosure may also be used with other fabricated axles (including those described herein) and, while it may be advantageous to employ such head plates in combination with fabricated vehicle axles, it should be understood that they may also be employed with non-fabricated vehicle axles.

Figure 28:
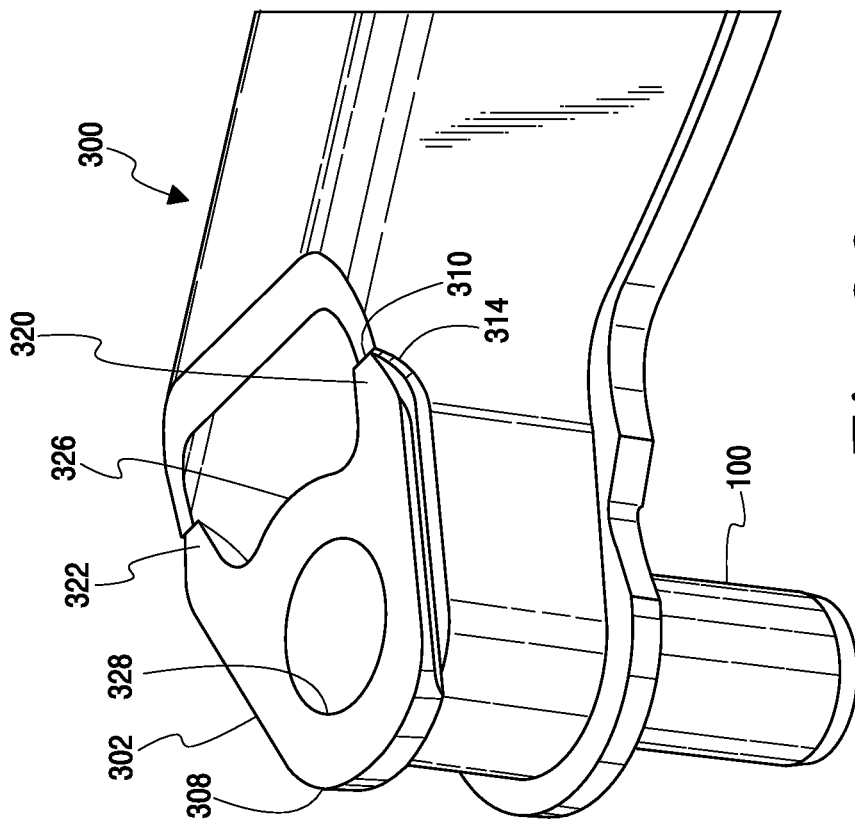
FIG. 28 is a cross-sectional perspective view of the axle head portion and head plate shown in FIG. 21.

FIGS. 19 and 23 illustrate another difference between the configurations of the head plate 302 and the head plate 216. The head plate 216 has a lateral width which increases from its front edge to its back edge 220, with a maximum width at or adjacent to the back edge 220 (FIGS. 19 and 29). Such a configuration may be disadvantageous because the change in wall thickness from the channel 112 to the head plate 216 is large, causing the stiffness gradient to be relatively high and concentrating any deflection between the two parts on the weld root. In contrast, the illustrated head plate 302 has a sidewall 308 with a lateral width which increases from its front edge toward its back edge 310, but which decreases at an inflection point 316, such that the width of the head plate 302 at the back edge 310 is generally the same as or slightly less than the width of the channel surface 314 to which it is secured (FIGS. 23 and 28). Additionally, the bottom surface 306 of the head plate 302 may be provided with a pocket or indentation 318 (FIG. 30) defined between left and right ends 320 and 322 of the back edge 310. In such a configuration, the width of each left and right end 320 and 322 is comparable to the width of the associated channel wall 314 (FIG. 28). By providing a back edge with a width that is comparable to that of the associated channel, there is a more gradual stiffness change from the channel to the head plate, thereby moving the high stress area from the weld to the head plate, which typically has a higher fatigue performance than the weld. Additionally, if the width of the back edge of the head plate is slightly less than the width of the channel, a portion of the channel wall 314 will be exposed (FIGS. 21, 23, and 28) to present an area to be welded or otherwise secured to the back edge 310 of the head plate 302.

In addition to providing a back edge with a width slightly less than that of the axle channel, the back edge may also be provided with a chamfer 324 (FIGS. 22, 24, 25, and 30) to expose even more of the channel wall. By exposing more of the edge of the axle channel, weld torch access is enhanced. Such a chamfered back edge may be practiced with other head plates (including the head plate 216 of FIG. 14) and is not limited to the head plate 302. The chamfer 324 is not limited to the back edge 310, but may be present in other portions of the sidewall 308, the top edge 304, and/or the bottom edge 306 of the head plate 302. In the illustrated embodiment, at least a portion of the back edge 310 of the sidewall 308 is chamfered, as well as at least a portion of the bottom surface 306. By providing a chamfer 324, the perimeter of the head plate 302 may extend at selected locations beyond the perimeter of the channel mouth 312 (thereby increasing the size and strength of the head plate 302), while allowing for access to the channel wall at those same locations for securing the head plate 302 to the axle head portion 300.

FIGS. 30 and 31 show the bottom surfaces of the head plates 302 and 216, respectively. In the illustrated embodiment, the bottom surface 306 of the head plate 302 includes an indentation or pocket 318, which reduces the stiffness gradient at the channel-head plate interface, further increasing fatigue life. While the bottom surface of the head plate 216 does not include such a pocket, it should be understood that an indentation or pocket according to the present disclosure may be employed in combination with known head plates, including the head plate 216 of FIG. 31.

The pocket 318 may be variously configured but, in the embodiment of FIG. 30, at least a portion of the pocket 318 is defined by the bottom surface 306 and by the back edge 310. The illustrated pocket 318 has a width less than the width of the back edge 310, such that it is defined between left and right edges 320 and 322 of the back edge 310. The width of the left and right edges 320 and 322 may be comparable to the width of the channel wall 314 to which the left and right edges 320 and 322 are to be secured (as described above), with the pocket 318 being substantially entirely received within the interior of the axle channel (FIG. 26). The depth of the pocket 318 may vary, for example having a depth which is less than the thickness of the head plate 302 in at least some locations (such that the corresponding portion of the top or bottom surface remains intact) and other locations where the pocket 318 passes entirely through the head late 302, as shown in FIG. 30.

One surface 326 of the pocket 318 shown in FIG. 30 is oriented generally vertically and configured to be arcuate and generally coaxial with a hole 328 extending between the top and bottom surface 304 and 306 to receive a king pin 100. Such a configuration may be advantageous to ensure that there is sufficient material in the area surrounding the hole 328, with sufficient strength to support the forces arising from the interaction between the head plate 302 and the king pin 100. The pocket 318 is shown as being substantially symmetrical about a centerline of the head plate 302, which may be preferred for manufacturing, structural, and/or functional reasons, but it is also within the scope of the present disclosure for the pocket 318 to be asymmetrical.

In addition to a pocket surface 326 which is generally coaxial with the hole 328, the head plate 302 may be thicker than the head plate 216 of FIG. 14 for improved king pin retention under higher brake torques that are often experienced during use. A thicker head plate also tends to enhance the performance of the axle in lateral fatigue and helps to better couple out the moment induced on the head plate 302 and the welds securing it to the axle head portion 300. The exact thickness employed may vary without departing from the scope of the present disclosure, but there are some conflicting factors which may be advantageous to consider when selecting a head plate thickness and a head plate configuration in general. For example, in the interest of maximizing king pin retention and overall strength, it may be advantageous to provide a head plate having a relatively large and uniform thickness (e.g., a head plate without a pocket). However, if the head plate does not include a pocket, it is possible for the welds between the head plate and the thinner channel walls to become highly stressed under brake torque and/or longitudinal load application. Thus, different performance needs and manufacturing capabilities may call for differently configured head plates, so the head plate and associated axle head portion illustrated herein should be considered exemplary, rather than limiting.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A head plate for incorporation into the head section of a vehicle axle, comprising:
    a top surface;
    a bottom surface; and
    a sidewall extending between the top and bottom surfaces, wherein a back edge of the sidewall is configured to be connected to the head section and is rounded to define an arc starting at the top surface and ending at the bottom surface.

2. The head plate of claim 1, wherein the back edge of the sidewall substantially defines a semicircle starting at the top surface and ending at the bottom surface.

3. The head plate of claim 1, wherein at least a portion of the bottom surface is chamfered.

4. The head plate of claim 1, wherein at least a portion of the back edge of the sidewall is chamfered.

5. The head plate of claim 1, wherein at least a portion of the bottom surface and at least a portion of the back edge are chamfered.

6. The head plate of claim 1, further comprising a pocket defined in the bottom surface.

7. The head plate of claim 6, further comprising a hole extending between the top and bottom surfaces, wherein a surface of the pocket is arcuate and generally coaxial with the hole.

8. The head plate of claim 6, wherein at least a portion of the pocket is defined by the back edge.

9. The head plate of claim 8, wherein the pocket is defined between left and right ends of the back edge.

10. A head plate for incorporation into the head section of a vehicle axle, comprising:
    a top surface;
    a bottom surface; and
    a sidewall extending between the top and bottom surfaces, wherein a pocket is defined in the bottom surface, at least in part by a back edge of the sidewall, between left and right ends of the back edge and with a width less than the width of the back edge, and wherein the pocket is configured to be at least partially received within the head section.

11. The head plate of claim 10, wherein at least a portion of the bottom surface is chamfered.

12. The head plate of claim 10, wherein at least a portion of a back edge of the sidewall is chamfered.

13. The head plate of claim 10, wherein at least a portion of the bottom surface and at least a portion of a back edge of the sidewall are chamfered.

14. The head plate of claim 10, further comprising a hole extending between the top and bottom surfaces, wherein a surface of the pocket is arcuate and generally coaxial with the hole.

15. A head plate for incorporation into the head section of a vehicle axle, comprising:
    a top surface;
    a bottom surface; and
    a sidewall extending between the top and bottom surfaces, wherein
        a back edge of the sidewall is configured to be connected to the head section and is rounded from the top surface to the bottom surface,
        the back edge of the sidewall substantially defines a semicircle from the top surface to the bottom surface, and an upper portion of the semicircle is substantially tangential with the top surface and a lower portion of the semicircle is substantially tangential with the bottom surface.

* * * * *